United States Patent [19]

Tabei

[11] Patent Number: 4,720,759

[45] Date of Patent: Jan. 19, 1988

[54] COMPACT PROTECTOR UTILIZING A BIMETAL AND AN EXCESSIVE RISE PREVENTION PORTION

[75] Inventor: Shigeru Tabei, Machida, Japan

[73] Assignee: Tobu Electric Co., Ltd., Tokyo, Japan

[21] Appl. No.: 877,561

[22] Filed: Jun. 23, 1986

[30] Foreign Application Priority Data

May 15, 1986 [JP] Japan ................................ 61-109411

[51] Int. Cl.[4] ................................................ H02H 5/04

[52] U.S. Cl. ...................................... 361/105; 361/24; 361/124; 200/83 P; 300/4; 300/13

[58] Field of Search .................................... 361/23–26, 361/83, 103–105, 124; 200/83 P, 83 Y; 337/2, 3, 4, 12, 13, 199

[56] References Cited

U.S. PATENT DOCUMENTS

| | | | |
|---|---|---|---|
| 3,701,068 | 10/1972 | Johnsen | 361/26 X |
| 3,840,834 | 10/1974 | Obenhaus et al. | 361/105 X |
| 4,328,406 | 5/1982 | Evans et al. | 200/83 P X |
| 4,456,941 | 6/1984 | Fraser, Jr. et al. | 361/105 |
| 4,538,201 | 8/1985 | Wuyts et al. | 361/105 X |

*Primary Examiner*—A. D. Pellinen

*Assistant Examiner*—Jeffrey A. Gaffin

*Attorney, Agent, or Firm*—Jordan and Hamburg

[57] ABSTRACT

This invention relates to a compact protector which is used to prevent the over-heat of a compact motor used in heat generating appliances such as a hair dryer or electric washing machine. The protector incorporates therein an excess current prevention portion utilizing a bimetal and an excessive temperature rise prevention portion utilizing a temperature fuse. The protector opens an electric path by the double safety devices.

21 Claims, 6 Drawing Figures

COMPACT PROTECTOR UTILIZING A BIMETAL AND AN EXCESSIVE RISE PREVENTION PORTION

BACKGROUND OF THE INVENTION

This invention relates to a compact protector which is used to prevent excessive heating of a compact motor or the like that is used in heat generating appliances such as a hair dryer, a dish dryer, and the like, or in electric washing machine, an electric shutter, and the like. More particularly, the present invention relates to a protector with built-in double safety means which opens an electric path when an excess current and the rise of an ambient temperature take place. The protector of the present invention can prevent both the excess current and the excessive rise of temperature, and can accurately set its operating temperature.

[Prior Art Technique]

A bimetal or a fuse has been used alone conventionally in compact protectors of the kind described above.

Heretofore known protectors using the bimetal alone can be divided into the following groups.

(1) A protector wherein a contact spring itself is made of a bimetal material, as disclosed in Japanese Patent Publication Nos. 6971/1980, 5704/1976, 18069/1976, etc.

(2) A protector wherein a bimetal is added substantially in parallel with the contact spring, as disclosed in Japanese Patent Publication No. 31694/1981 and Japanese Utility Model Publication No. 40505/1983.

(3) A protector wherein a rocking bimetal is interposed between a base to which the contact spring is fixed and the contact spring, as disclosed in Japanese Patent Publication No. 22332/1984 and Japanese Utility Model Publication No. 46512/1983.

On the other hand, known protectors using a fuse is as follows.

(4) A protector wherein a spring material is fixed by a resin and used as a temperature fuse, as disclosed in Japanese Utility Model Publication No. 38512/1983.

In the protectors of the type (1) wherein the contact spring is made of the bimetal material, the operating temperature at a steady current and the operating time at an excess current are generally determined experimentally by suitably selecting the operating temperature of the bimetal at the time of a non-load current. However, it has been difficult to set both the operating temperature at the steady current and the operating time at the excess current to desired values due to the influences of Joule heat of the current that flows through the bimetal.

In the protectors of the type (2) wherein the bimetal is added to the contact spring, the bimetal is caulked to the base together with the contact spring so that the bimetal receives initial stress at the time of caulking. This initial stress in turn causes variance of temperature setting. In addition, the bimetal must be replaced by removing the caulking portion in order to regenerate the products which are rejected as defective at an inspection step.

In the protectors of the type (3) wherein the rocking bimetal devoid of caulking is used, the problems of the change of the temperature characteristics and the replacement of the bimetal do not occur. However, if the effective stroke is small at the time of rocking of the bimetal, the contact causes chattering and the operation proves defective.

In the protectors of the type (4) wherein the spring material is fixed by a resin and used as a temperature fuse, a considerable time is necessary before the resin is molten; hence, it has been difficult to set an accurate fusing time. In the case of conventional fuses which are fused by an excess current, the fuses are not fused by the rise of an ambient temperature and cannot be used for the purpose of protecting the temperature rise of appliances.

As described above, the heretofore known protectors have not entirely been satisfactory. Moreover, they can be used only to cut off the excess current or to prevent the excessive rise of temperature. In other words, the conventional protectors cannot cut off the excess current simultaneously with the prevention of the excessive rise of temperature. Particularly in the case of the bimetal type protectors, they cannot often cut off the excess current due to the damage of the bimetal or fusing of the contact and cause breakage of appliances.

The applicant of the present invention previously developed a protector which consists of a bimetal type protector portion utilizing a rocking bimetal and a fuse unit which serves also as a resistor and the protector thus includes double safety means. However, the bimetal used in this prior protector is operated by the temperature rise of the resistor which is spaced apart from the bimetal. For this reason, it has been difficult to accurately operate the bimetal with respect to the excess current. In order to operate the bimetal, on the other hand, great exothermy of the resistor is indispensable, so that the fusing temperature of the fuse unit cannot be set accurately and easily.

SUMMARY OF THE INVENTION

In order to accurately operate the bimetal at an arbitrary set temperature, it is preferred that a current is not caused to flow directly through the bimetal and moreover, the exothermy due to the excess current is directly transmitted to the bimetal. It is further preferred that a fuse, which is fused by the rise of an ambient temperature but not by the exothermy due to the excess current, be incorporated in the protector in order to open an electric path and to protect the appliance when the protector proves inoperative due to fusing of the electric contacts or to the damage of the bimetal. If the fuse is fused by the rise of the ambient temperature, its fusing temperature can be set accurately.

To solve the problems described above, the protector in accordance with the present invention comprises a bimetal type protector portion and a fuse unit, wherein the bimetal type protector portion comprises a contact spring made of a spring material having relatively high electric resistance, a movable contact formed at the tip of the contact spring, an insulating base, the other end of the contact spring is disposed on the base in such a manner that the movable contact can be opened and closed with respect to a fixed contact, a projection formed near the center of the contact spring in such a manner as to project towards the base, and a rocking bimetal disposed operatively on the base in such a manner that its high expansion side comes into contact with said projection of the contact spring; and the fuse unit comprises a fixed fuse plate and a movable fuse plate each of which is made of a spring material having relatively low electric resistance, is fused to each other by a temperature fuse and is disposed on the base, the movable fuse plate is urged in a direction separating from the fixed fuse plate, and one of the ends of either the fixed fuse plate or the movable fuse plate is connected electrically to the fixed contact.

Since the contact spring has high electric resistance, it causes Joule heat when a current is passed through it and the resulting heat directly heats the rocking bimetal, thereby operating the bimetal and opening the contact. Even if the contact is not opened, fuse unit causes heat by the temperature fuse alone. Therefore, the temperature fuse is fused at an accurate set temperature and opens the circuit.

BRIEF DESCRIPTION OF THE DRAWINGS

The accompanying drawings illustrate a protector in accordance with one embodiment of the present invention, wherein.

DESCRIPTION OF THE PREFERRED EMBODIMENTS

Figure 1:
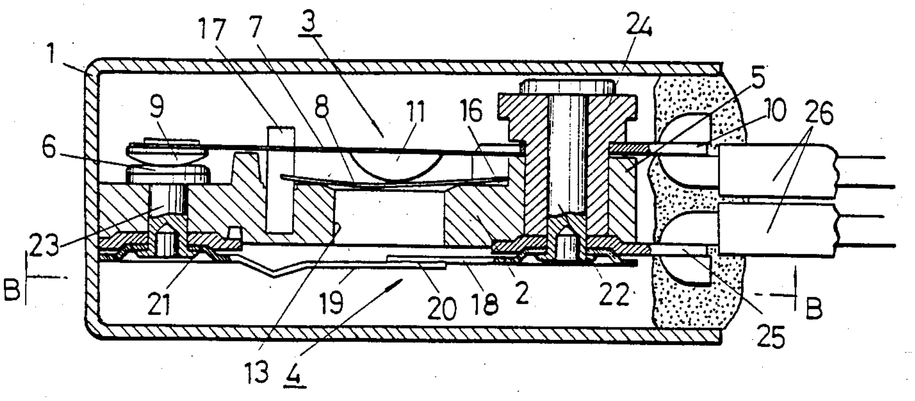
FIG. 1 is a sectional view taken along line A—A of FIG. 2.
Figure 2:
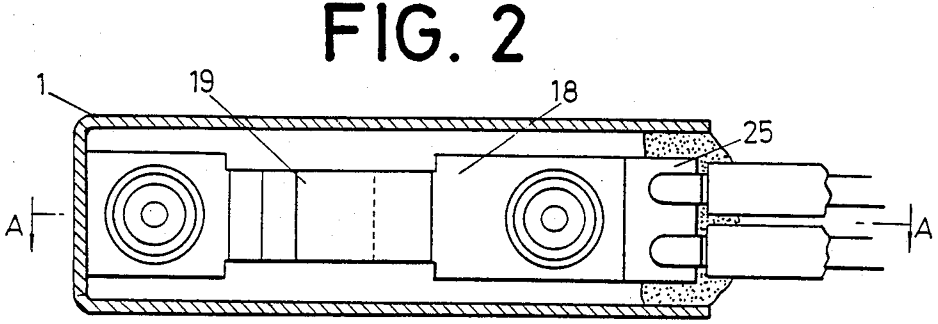
FIG. 2 is a sectional view taken along line B—B of FIG. 1.
Figure 3:
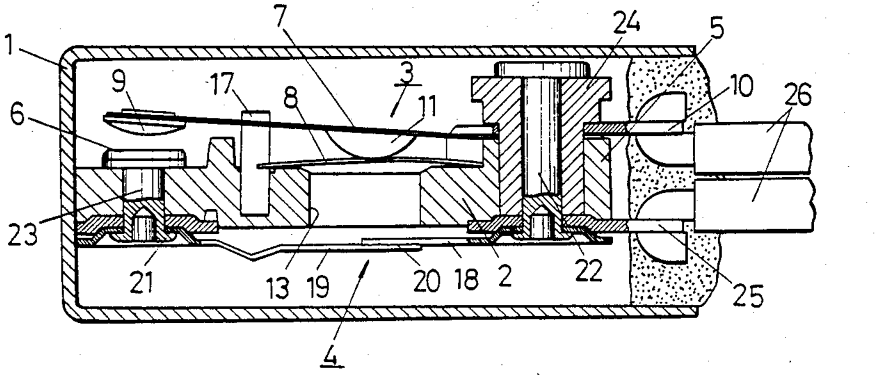
FIG. 3 is a sectional view showing the operating state of a rocking bimetal.
Figure 4:
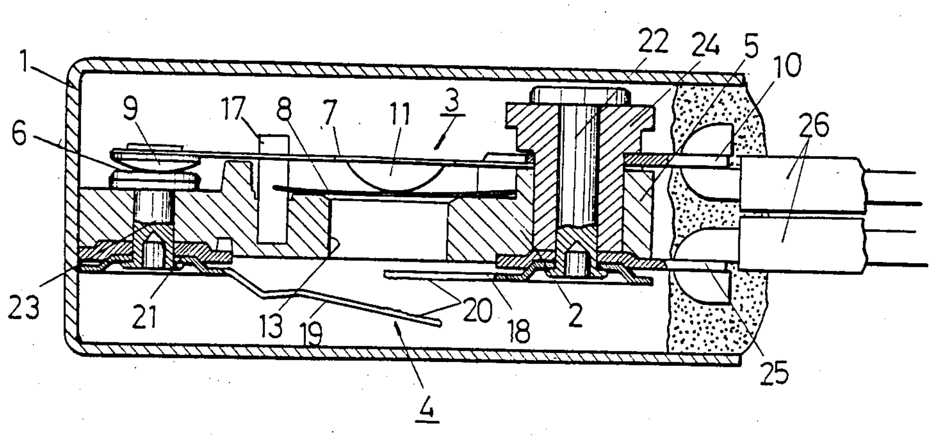
FIG. 4 is a sectional view showing a state in which the rocking bimetal does not operate but a temperature fuse is fused.
Figure 5:
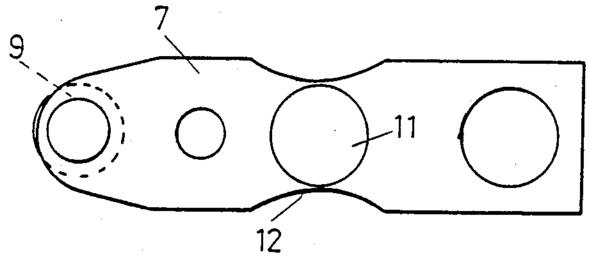
FIG. 5 is a plan view of a contact spring.

Hereinafter, the protector in accordance with one embodiment of the present invention will be described with reference to the accompanying drawings.

Reference numeral 1 represents a casing of the protector; 2 is a base; 3 is a bimetal type protector portion; and 4 is a fuse unit. The base 2 is produced by shaping a heat-resistant dielectric material in an elongated sheet form. Ceramics can be used as the heat-resistant dielectric material. A fitting portion 5 is formed at one of the ends of the upper surface of the base while a fixed contact 6 is formed at the other end.

The bimetal type protector portion 3 consists of a contact spring 7 and a rocking bimetal 8. The contact spring 7 is made of a spring material having relatively high electric resistance such as stainless steel, spring steel, ferrochrome, nickel chrome, and the like. The spring material having relatively high electric resistance is selected so that the contact spring 7 rapidly causes exothermy. A moving contact 9 is formed at the tip of the contact spring 7, and its other end is put on the fitting portion 5 of the base 2 in electric connection with an upper terminal 10. The moving contact 9 can be opened and closed relative to the fixed contact 6. A projection 11 which projects towards the base 2 is formed at the center of the contact spring 7. Notches 12 are formed on both sides of this projection 11. When the width of the projection 11 is adjusted, the notch 12 adjusts the electric resistance of the projection 11 and sets an exothermic calory to an arbitrary value.

Figure 6:
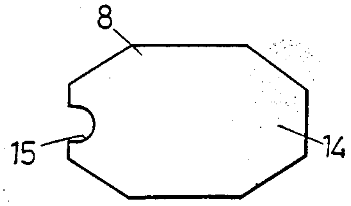
FIG. 6 is a plan view of the rocking bimetal.

A through-hole 13 having an increased diameter is bored at the center of the base 2 in order to establish good ventilation of the upper and lower surfaces of the base 2. The rocking bimetal 8 has a shallow pan-like shape which is somewhat curved vertically, and its high expansion coefficient side is arranged on the upper surface of the base 2 in such a manner as to come into contact with the projection 11 of the contact spring 7 and to face the through-hole 13. The rocking bimetal 8 is equipped with a tongue 14 at one of its ends and with a groove 15 at the other, as depicted in FIG. 6. The tongue 14 is inserted into a notch 16 of the base 2, while the groove 15 is meshed with a pin 17 which is implanted to the base 2.

The fuse unit 4 consists of a fixed fuse plate 18, a movable fuse plate 19 and a fuse portion 20 which fuses them by a temperature fuse, and is disposed on the lower surface of the base 2. Both the fixed and movable fuse plates 18 and 19 are made of a spring material having relatively low electric resistance, such as phosphor bronze sheet, nickel silver sheet, copper-titanium type alloy sheet, and the like. The material having relatively low electric resistance is used in order to minimize the exothermy of the fixed and movable fuse plates 18 and 19 and to make fusing of the fuse portion 20 of the temperature fuse only dependent upon the ambient temperature.

The fixing portion 21 of the movable fuse plate 19 is conductive to the fixed contact 6 and is urged in a direction leaving the fixed fuse plate 18. Since the fuse unit 4 is directed to secure safety when the bimetal type protector portion 3 does not operate, a fuse which is fused at a temperature considerably higher than the operating temperature of the rocking bimetal 8 is used as the temperature fuse. It is preferred that the fuse portion 20 is placed at a position where it faces the through-hole 13 in order to make it sensitive to the ambient temperature.

The contact spring 7 and the fixed fuse plate 18 and the movable fuse plate 19 and the fixed contact 6 may be disposed separately on the base, respectively, but may be fixed integrally to the base 2 by rivets 22, 23 as shown in the drawing. In such a case, the contact spring 7 and the fixed fuse plate 18 must be electrically isolated from each other. Accordingly, they are fixed by the rivet 22 via an insulating pipe 24. When fixing is made by the rivet 22, fixing is made in such a manner that the contact spring 7 side clamps the upper terminal 10 while the fixed fuse plate side clamps simultaneously the lower terminal 25. Since the movable fuse plate 19 and the fixed contact 6 must be conductive with each other, conduction treatment is not particularly necessary if a conductive rivet 23 is used.

The protector of the present invention is mounted to an electric appliance and a cable 26 is connected to the upper and lower terminals 10 and 25. A current is then caused to flow through the cable 26. Under a normal state, the current flows in the sequence of the upper terminal 10→contact spring 7→movable contact 9→fixed contact 6→movable fuse plate 19→fuse portion 20→fixed fuse plate 18→lower terminal 25. Since the contact spring 7 is in contact with the rocking bimetal 8 at its projection 11, the rocking bimetal 8 is heated by the exothermy of the projection 11. Under the normal state, even when the rocking bimetal 8 is heated, the temperature is below the operating temperature of the bimetal so that the bimetal does not operate.

When an excess current flows through the circuit, it flows also through the contact spring 7 and the exothermy of the projection 11 becomes great. When the rocking bimetal 8 is heated above the operating temperature, it starts operating, separates the movable contact 9 from the fixed contact 6 and opens the electric path. The current does not flow through the rocking bimetal 8 itself. Therefore, the operating temperature of the bimetal and the exothermic temperature by the excess current can be selected easily and arbitrarily.

If the electric path is not opened even though the rocking bimetal 8 is heated above the operating temperature for some reason or other such as the damage of the rocking bimetal 8 or fusing of the movable contact 9 with the fixed contact 6, the safety means of the fuse unit 4 starts operating. Namely, as the ambient temperature rises, the temperature fuse of the fuse portion 20 of the fuse unit 4 is fused so that the movable fuse plate 19 is separated from the fuse plate 18 and the electric path is open.

In the protector in accordance with the present invention described above, the contact spring is made of a material having relatively high electric resistance so that heat is generated when a current is caused to flow through this contact spring, and the rocking bimetal is heated by the resultant heat. Therefore, the present invention provides the effect that the heating temperature of the bimetal can be set easily and accurately to an arbitrary temperature. The electric resistance of the projection can be changed by adjusting the width of the projection of the contact spring so that the heating temperature of the bimetal can be adjusted. Since the fixed fuse plate and the movable fuse plate of the fuse unit are made of a material having low electric resistance, no heat is generated at these members. Since the temperature fuse is affected only by the rise of the ambient temperature, it effectively presents the excessive rise of the temperature.

What is claimed is:

1. A protector comprising a bimetal type protector portion and a fuse unit: said bimetal type protector portion comprising: a contact spring made of a spring material having relatively high electric resistance; a movable contact formed at the tip of said contact spring; an insulating base; the other end of said contact spring being disposed on said base in such a manner that said movable contact can be opened and closed with respect to a fixed contact; a projection formed near the center of said contact spring in such a manner as to project towards said base; and a rocking bimetal disposed operatively on said base in such a manner that its high expansion side comes into contact with said projection of said contact spring; said fuse unit comprising: a fixed fuse plate and a movable fuse plate, each being made of a spring material having relatively low electric resistance, fused to each other by a temperature fuse and disposed on said base; said movable fuse plate being urged in a direction separating from said fixed fuse plate; one of the ends of either said fixed fuse plate or said movable fuse plate being connected electrically to said fixed contact.

2. The protector as defined in claim 1 wherein notches are formed on both sides of said projection of said contact spring.

3. The protector as defined in claim 1 wherein the material of said contact spring is stainless steel.

4. The protector as defined in claim 1 wherein the material of said contact spring is spring steel.

5. The protector as defined in claim 1 wherein the material of said contact spring is ferrochrome.

6. The protector as defined in claim 1 wherein the material of said contact spring is nickel chrome.

7. The protector as defined in claim 1 wherein said fixed fuse plate is made of phosphor bronze.

8. The protector as defined in claim 1 wherein said fixed fuse plate is made of beryllium copper.

9. The protector as defined in claim 1 wherein said fixed fuse plate is made of nickel silver.

10. The protector as defined in claim 1 wherein said fixed fuse plate is made of a copper-titanium alloy.

11. The protector as defined in claim 1 wherein said movable fuse plate is made of phosphor bronze.

12. The protector as defined in claim 1 wherein said movable fuse plate is made of beryllium copper.

13. The protector as defined in claim 1 wherein said movable fuse plate is made of nickel silver.

14. The protector as defined in claim 1 wherein said movable fuse plate is made of a copper-titanium type alloy.

15. The protector as defined in claim 1 wherein a through-hole is formed in said base, and said bimetal type protector portion and said fuse unit are disposed on the opposed surfaces of said base in such a manner that said rocking bimetal of said bimetal type protector portion and the fuse portion of said fixed fuse plate and said movable fuse plate of said fuse unit face said through-hole.

16. A protector comprising a bimetal type protector portion and a fuse unit: said bimetal type protector portion comprising: a contact spring; a movable contact formed at one end portion of said contact spring; a base means; a fixed contact on said base means; the other end portion of said contact spring being disposed on said base means in such a manner that said movable contact can be opened and closed with respect to said fixed contact; a projection formed on said contact spring; and a rocking bimetal means disposed operatively on said base and having an expanded position and a non-expanded position such that in said expanded position said rocking bimetal means contacts said projection of said contact spring to move said movable contact away from said fixed contact; said fuse unit comprising: a fixed fuse plate and a movable fuse plate fused to each other by a temperature fuse and disposed on said base; said movable fuse plate being urged in a direction separating said movable fuse plate from said fixed fuse plate; one of said fuse plates being connected electrically to said fixed contact.

17. A protector comprising a base means, a contact spring means, mounting means mounting one end portion of said contact spring means on said base means, a fixed contact on said base means, a movable contact on the other end portion of said contact spring means, said contact spring means being movable to a contact position where said movable contact contacts said fixed contact and to a non-contact position where said movable contact is out of contact with said fixed contact, rocking bimetal means disposed operatively on said base means and having an expanded position and a non-expanded position such that in said expanded position said rocking bimetal means contacts said contact spring means to move said movable contact away from said fixed contact, a fuse means electrically connected to said fixed contact, said rocking bimetal means being operable to move to its expanded position upon attaining one temperature, said fuse means being operable to open said electrical connection to said fixed contact upon attaining another temperature which is higher than said one temperature.

18. A protector according to claim 17 wherein said contact spring means comprises a spring member and a projection on said spring member, said projection being engaged by said rocking bimetal means to move said contact spring means to said non-contact position.

19. A protector according to claim 17 wherein said base means comprises a through hole, said rocking bimetal means being mounted over one end of said through hole.

20. A protector according to claim 17 further comprising guide means on said base means and on said contact spring means and on said rocking bimetal means for guiding said contact spring means as said contact spring means moves between said contact and said non-contact positions and for guiding said rocking bimetal means as said rocking bimetal means moves between said expanded and non-expanded position.

21. A protector according to claim 20 wherein said guide means comprises a pin mounted on said base means, said pin being slidably engageable with said contact spring means and said rocking bimetal means.

* * * * *